(12) United States Patent
Hunt et al.

(10) Patent No.: US 7,241,247 B1
(45) Date of Patent: Jul. 10, 2007

(54) TORQUE COUPLING WITH CONTROL VALVE

(75) Inventors: Gordon Hunt, Tecumseh, MI (US); Jungho Park, Ann Arbor, MI (US)

(73) Assignee: Torque-Traction Technologies, LLC., Maumee, OH (US)

( * ) Notice: Subject to any disclaimer, the term of this patent is extended or adjusted under 35 U.S.C. 154(b) by 115 days.

(21) Appl. No.: 11/156,722

(22) Filed: Jun. 21, 2005

(51) Int. Cl.
*F16H 48/20* (2006.01)

(52) U.S. Cl. ...................................................... 475/231

(58) Field of Classification Search ................ 475/231, 475/240, 249; 192/84.31, 84.9
See application file for complete search history.

(56) References Cited

U.S. PATENT DOCUMENTS

| | | | |
|---|---|---|---|
| 5,709,627 A | 1/1998 | Teraoka | |
| 6,070,495 A | 6/2000 | Kuroda et al. | |
| 6,095,276 A | 8/2000 | Kuroda et al. | |
| 6,165,095 A | 12/2000 | Till et al. | |
| 6,582,336 B2 | 6/2003 | Forrest et al. | |
| 6,692,396 B1 | 2/2004 | Grogg et al. | |
| 6,699,151 B2 | 3/2004 | Grogg et al. | |
| 6,733,411 B1 | 5/2004 | Kaplan et al. | |
| 6,761,662 B2 | 7/2004 | Iwazaki et al. | |
| 7,022,040 B2 * | 4/2006 | DeGowske et al. | ......... 475/231 |
| 7,077,779 B2 * | 7/2006 | Yoshioka et al. | ........... 475/231 |
| 2001/0044355 A1 | 11/2001 | Cheadle et al. | |
| 2003/0040390 A1 | 2/2003 | Forrest et al. | |
| 2004/0040801 A1 | 3/2004 | Yamamoto et al. | |

* cited by examiner

*Primary Examiner*—Ha Ho
(74) *Attorney, Agent, or Firm*—Berenato, White & Stavish

(57) ABSTRACT

A hydraulic torque-coupling assembly that includes a pressure relief valve with an annular solenoid actuator assembly that moves axially to engage an annular valve actuator ring to selectively close a pressure relief valve disposed on the outer face of a torque-coupling case. The annular solenoid assembly does not include a conventional armature so that the coil portion of the solenoid actuator assembly moves into and out of engagement with the annular valve actuator ring. The valve actuator ring rotates with the torque-coupling case, however, the solenoid assembly does not rotate. The valve actuator ring and solenoid assembly are mounted outside the differential case. A variable amount of electrical current is applied to the solenoid assembly so that the release pressure of the pressure relief valve assembly is selectively based on the magnitude of an electric current supplied to the solenoid assembly.

19 Claims, 5 Drawing Sheets

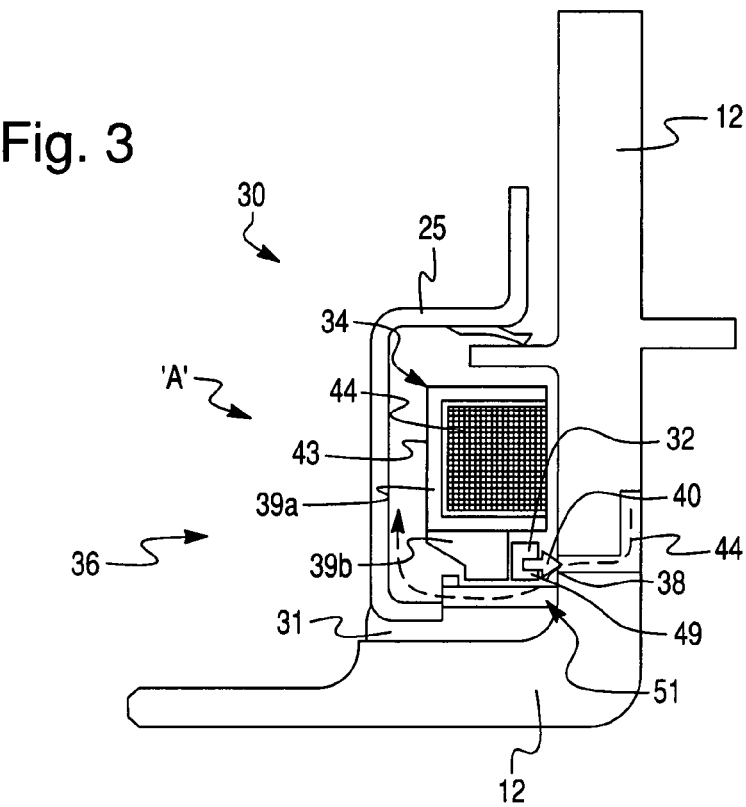
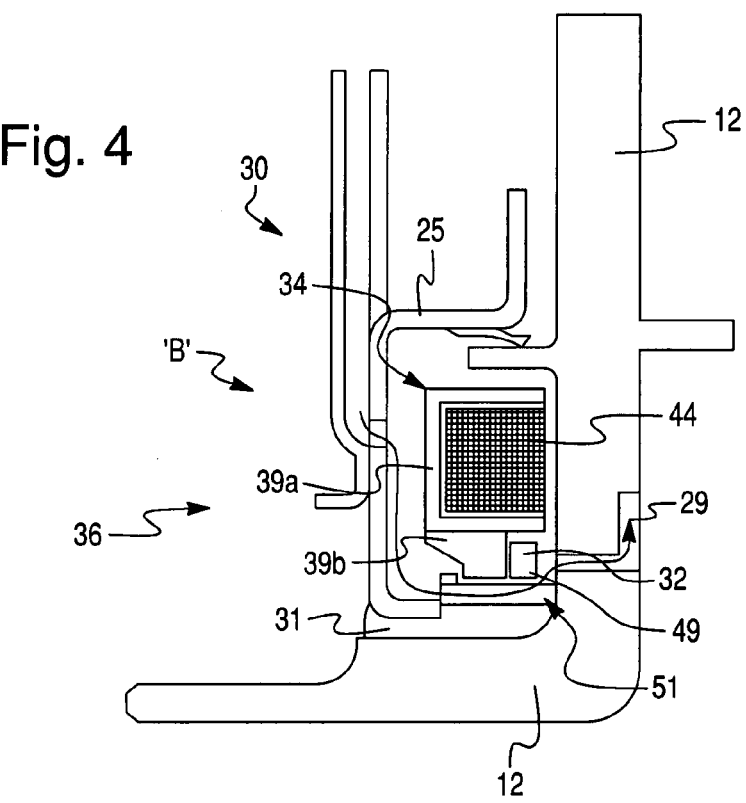

Fig. 8
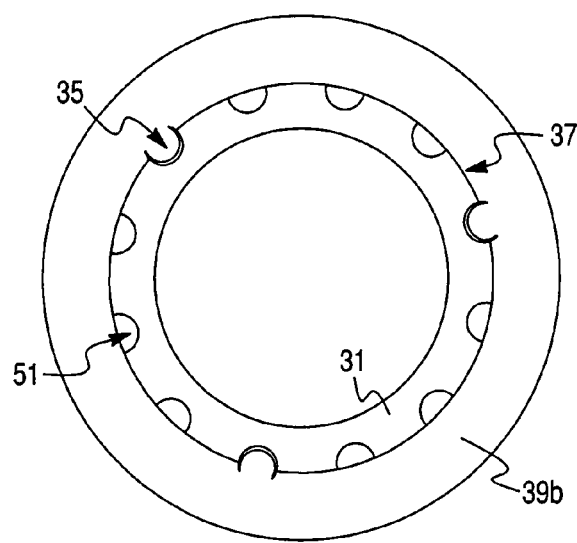
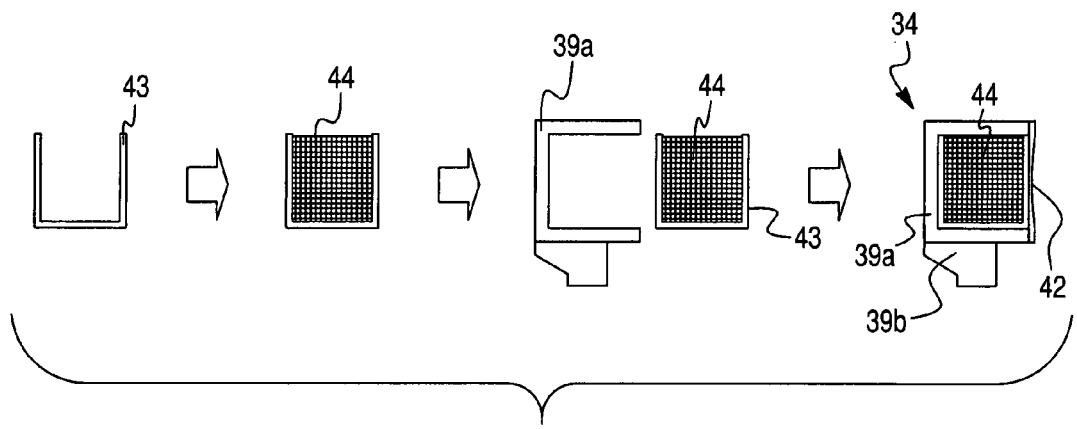
Fig. 9

TORQUE COUPLING WITH CONTROL VALVE

BACKGROUND OF THE INVENTION

1. Field of the Invention

The present invention relates to torque coupling assemblies for motor vehicles, and more particularly to a torque coupling assembly having an electronically controlled hydraulic actuator including an electromagnetically actuated variable pressure relief valve.

2. Description of the Prior Art

Hydraulic couplings are used in various vehicular drivetrain applications to limit slip and transfer drive torque between a pair of rotary members. In all-wheel drive applications, hydraulic couplings are used to automatically control the drive torque transferred from a driven member to a non-driven member in response to speed differentiation therebetween. In limited slip applications, couplings are used in association with a differential to automatically limit slip and bias the torque distribution between a pair of rotary members.

Such hydraulic couplings conventionally use a frictional clutch between the rotary members. The frictional clutch may be selectively actuated by various hydraulic actuator assemblies, which are constructed of elements disposed inside the differential casing. The hydraulic actuator assemblies internal to a torque-coupling case often include displacement pumps disposed inside the torque-coupling case and actuated in response to a relative rotation between the torque-coupling case and the output shaft. The displacement pumps are usually in the form of internal gear pumps, such as gerotor pumps adapted to convert rotational work to hydraulic work. In the internal gear pumps, an inner gear having outwardly directed teeth cooperates with an external gear having inwardly directed teeth so that fluid chambers therebetween increase and decrease in volume as the inner and outer gears rotate in a housing.

While known hydraulic couplings, including but not limited to those discussed above, have proven to be acceptable for various vehicular driveline applications, such devices are nevertheless susceptible to improvements that may enhance their performance and cost. With this in mind, a need exists to develop improved hydraulic torque-coupling assemblies that advance the art.

SUMMARY OF THE INVENTION

The current invention comprises a torque-coupling assembly. The torque-coupling assembly includes a torque-coupling case rotated by an outside drive torque. At least one output shaft is drivingly operatively connected to the torque-coupling case. The torque-coupling case also includes friction clutch pack for selectively engaging and disengaging the torque-coupling case with the output shaft. The torque-coupling assembly also includes a hydraulic clutch actuator for selectively frictionally loading the clutch pack. The actuator includes a hydraulic pump for generating a hydraulic pressure to frictionally load the clutch pack, and a variable pressure relief valve assembly to selectively control the friction clutch pack. The variable pressure relief valve assembly has an electro-magnetic coil that is associated with an electro-magnetic actuator. The electro-magnetic coil is axially movable relative to the torque-coupling case in response to a magnetic flux generated by the coil when an electrical current is supplied to the coil.

The invention also comprises a variable pressure relief valve system for a differential assembly. The differential assembly comprises an auxiliary housing that is rotatably mounted to the exterior of a differential case. An annular actuator ring disposed within the housing has a first planar side, and a second non-planar side, and includes a valve closure member and two alignment apertures. An annular solenoid assembly is positioned adjacent the actuator ring within the auxiliary housing. The solenoid assembly comprises an annular coil winding, and a pusher bracket encasing the annular coil. The annular coil applies a force to the planar side of the actuator ring so that the valve closure member is urged into a complementary valve seat in the differential case when an electrical current is applied to the annular coil. The force applied to the actuator ring is proportional to the electrical current so that the release pressure of the pressure release valve system is variable based on the electrical current applied to the annular coil.

BRIEF DESCRIPTION OF THE DRAWINGS

Other objects and advantages of the invention will become apparent from a study of the following specification when viewed in light of the accompanying drawings, wherein:

FIG. 3 is an enlarged partial sectional view of a variable pressure relief valve assembly shown in a circle 'A' in FIG. 2;

FIG. 4 is an enlarged partial sectional view of a variable pressure relief valve assembly shown in a circle 'B' in FIG. 2;

FIG. 8 is a plan view of a pusher bracket and bushing assembly.

FIG. 9 shows the construction of the solenoid assembly.

DETAILED DESCRIPTION OF PREFERRED EMBODIMENTS

The preferred embodiment of the present invention will now be described with the reference to accompanying drawings.

Figure 1:
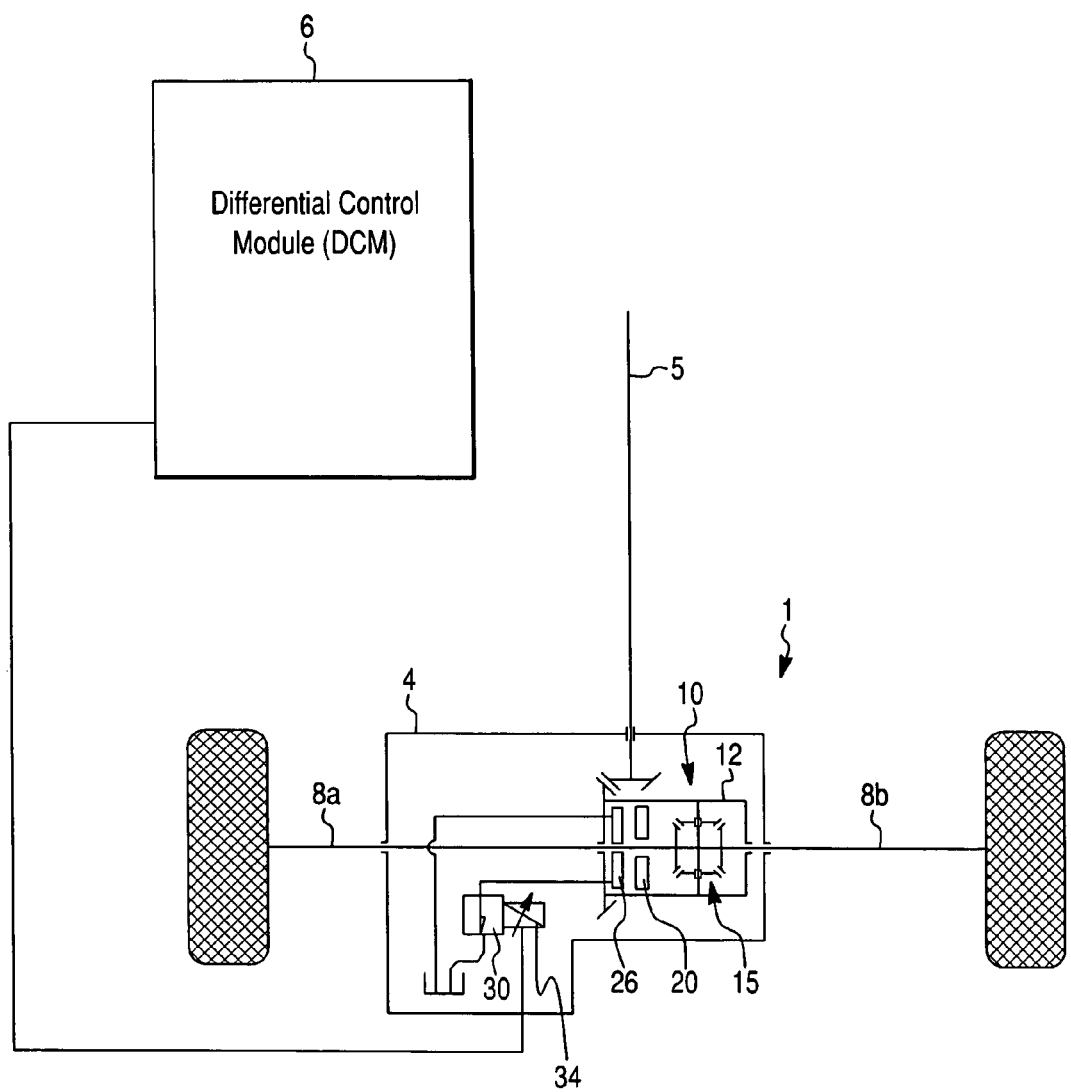
FIG. 1 is a schematic diagram of a rear axle assembly of a motor vehicle including an electronically controlled limited slip differential assembly.

FIG. 1 schematically depicts a rear wheel drive axle assembly 1 including a torque-coupling assembly in the form of a limited slip differential assembly 10. The differential assembly 10 comprises a differential case (or a torque-coupling case) 12 rotatably supported within an axle housing 4. An engine (not shown) transmits torque through a drive shaft 5 to a differential gear mechanism 15 within the differential case 12.

As further shown in FIG. 1, the differential assembly 10 includes a multi-disk friction clutch pack 20 and a speed sensitive hydraulic displacement pump 26. The speed sensitive hydraulic displacement pump 26 provides pressurized hydraulic fluid for actuating the clutch pack 20. In the preferred embodiment, the hydraulic displacement pump 26 is a gerotor pump. However, any type of hydraulic pump capable of generating hydraulic pressure in response to the relative rotation between the differential case 12 and one of the output axle shafts 8a, 8b is within the scope of the present invention.

The schematic in FIG. 1 also includes a variable pressure relief valve assembly 30 that selectively controls the pressure applied to actuate the clutch pack 20. The variable pressure relief valve assembly 30 includes an electromagnetic actuator 34. In the preferred embodiment the electromagnetic actuator 34 is a solenoid assembly. The solenoid assembly 34 may optionally be controlled by a Differential Control Module 6.

Figure 2:
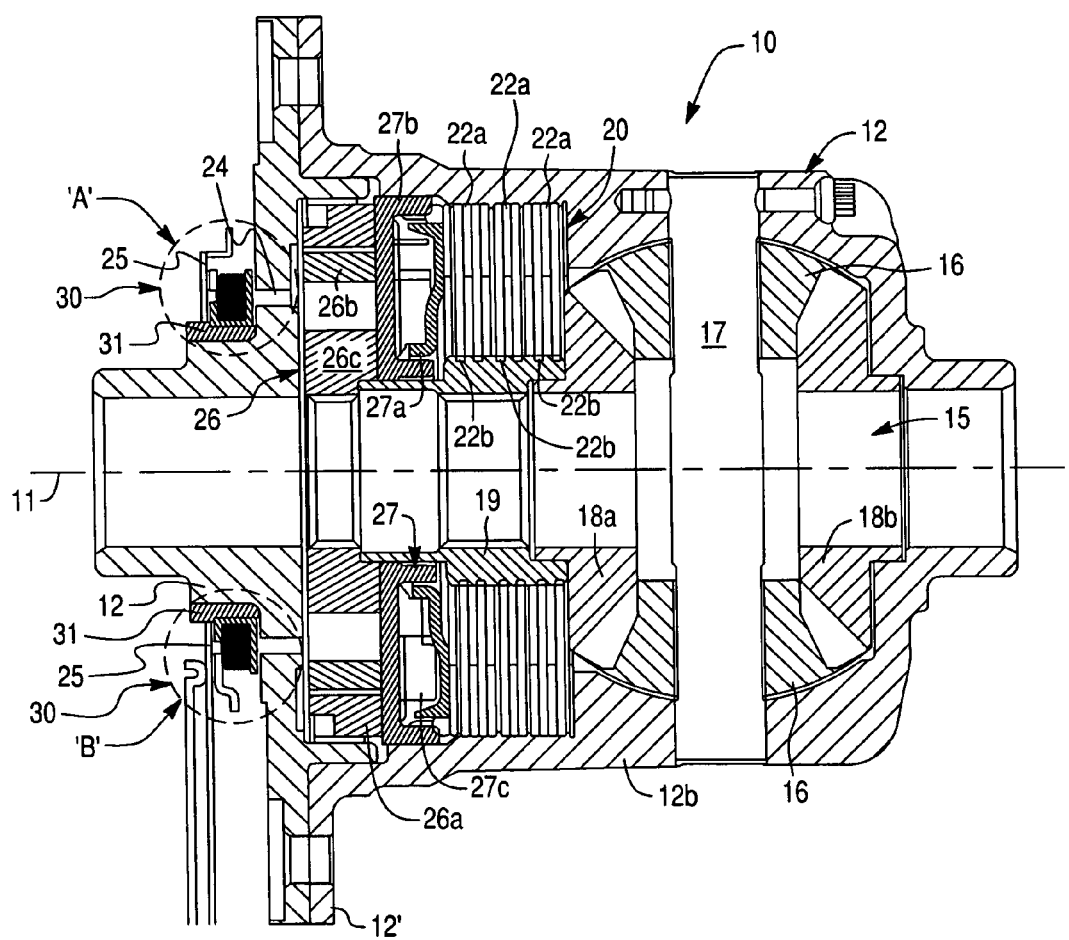
FIG. 2 is a sectional view of the electronically controlled limited slip differential assembly in accordance with the present invention.

FIG. 2 illustrates the preferred embodiment of the current invention in more detail. As shown in FIG. 2, the friction clutch pack 20 includes sets of alternating outer friction plates 22a and inner friction plates 22b. The outer friction plates 22a have projections that engage corresponding grooves formed in the differential case 12. Similarly, the inner friction plates 22b have projections that engage corresponding grooves formed in the clutch sleeve 19. The clutch sleeve 19 is splined to the associated axle shaft 8a (shown in FIG. 1). Both the outer friction plates 22a and the inner friction plates 22b are slideable in the axial direction. When the limited slip differential assembly 10 is actuated by the hydraulic clutch actuator system, the outer clutch plates 22a frictionally engage the inner clutch plates 22b to form a torque coupling between the differential case 12 and the output shaft 8a.

The hydraulic clutch actuator system includes the gerotor pump 26, and a piston assembly 27. As described above, the gerotor pump 26 generates hydraulic pressure that is substantially proportional to a rotational speed difference between the differential case 12 and one of the axle output shafts 8a, 8b (shown in FIG. 1). The gerotor pump 26 design is well known in the art and includes an outer ring member 26a, an outer rotor 26b, and an inner rotor 26c.

The piston assembly 27 comprises a hydraulically actuated piston 27a that is positioned within a piston housing 27b. A pressure chamber 27c is created between the piston 27a and the piston housing 27b. Hydraulic fluid from the gerotor pump 26 is directed to the piston pressure chamber 27c. When the pressure relief valve assembly 30 is closed, the pressurized hydraulic fluid supplied by the gerotor pump 26 causes the pressure within the piston pressure chamber 27c to increase until the pressure chamber 27c begins to expand. As the piston pressure chamber 27c expands, the expansion forces the piston 27a to move axially, thereby engaging the clutch pack 20 and actuating the differential assembly 10. Actuation of the differential assembly 10 allows for a torque transfer distribution between the axle shafts 8a and 8b.

As best shown in FIG. 2, the pressure relief valve assembly 30 is housed in an auxiliary solenoid housing 25. The auxiliary housing 25 extends inwardly from the axle housing 4 (shown in FIG. 1). The variable pressure relief valve assembly 30 is also rotatably mounted to the differential case 12 through a bushing assembly 31. As shown in FIGS. 3 and 4, the pressure relief valve assembly 30 is primarily comprised of a pressure relief valve actuator ring 32 and a solenoid assembly 34 that are partially enclosed in a solenoid housing 25.

FIG. 3 shows a partial cross-section ('A') of the outlet valve portion of the pressure relief valve assembly 30. A valve closure member 40 of the valve actuator ring 32 is positioned opposite a substantially conical valve seat 38. For illustration purposes, only the valve closure portion 40 and a cross-section of the body 49 of the actuator ring 32 are shown in FIG. 3. The valve seat 38 is positioned on the face of the differential case 12 at the point where a differential case outlet passage 24 exits the differential case 12. The valve seat 38 is in fluid communication with the piston pressure chamber 27c through the differential case outlet passage 24. The valve closure member 40 is movable between a closed position in which the valve closure member 40 engages the valve seat 38, and an open position in which the valve closure member 40 is axially spaced away from the valve seat 38. FIG. 3 shows the pressure relief valve assembly 30 in the partially closed position so that the valve closure member 40 partially blocks the differential case outlet passage 24 at the valve seat 38.

As shown in FIG. 3, the valve actuator ring 32 is disposed adjacent to the solenoid assembly 34. The solenoid assembly 34 includes an electromagnetic coil winding 44 enclosed in a bobbin shell 43. The bobbin 43 is seated in a metal coil housing 39a. A plastic pusher bracket 39b is over-molded onto the inner periphery of the coil housing 39a. The pusher bracket 39b abuts the valve actuator ring 32. The pusher bracket 39b rides on the outer periphery of a bushing 31, and the inner periphery of the bushing 31 abuts a cylindrical extension of the differential case 12. As hydraulic fluid exits the differential case 12, it flows through scalloped portions 51 of the bushing 31.

FIG. 4 shows a partial cross-section ('B') of a portion of the pressure relief valve assembly 30 associated with the hydraulic fluid inlet passage 29. For illustration purposes, only a fragmentary cross-section of the actuator ring 32 is shown. The valve actuator ring 32 is disposed adjacent the solenoid assembly 34 as shown in FIG. 3 and described above. Hydraulic fluid is drawn into the differential case 12 through scalloped portions 51 of the bushing 31 and into the inlet passage 29. The fluid is then directed to the gerotor pump 26 where it is pressurized within the piston pressure chamber 27c, or directed out of the differential case 12 through the differential case outlet passage 24.

Figure 5:
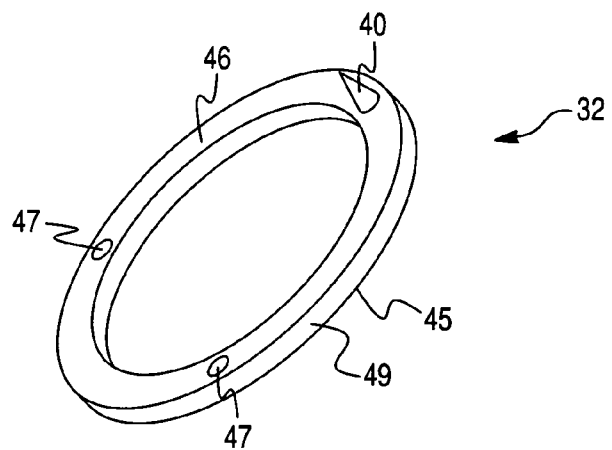
FIG. 5 is an isometric view of a pressure relief valve actuator ring of the current invention.
Figure 6:
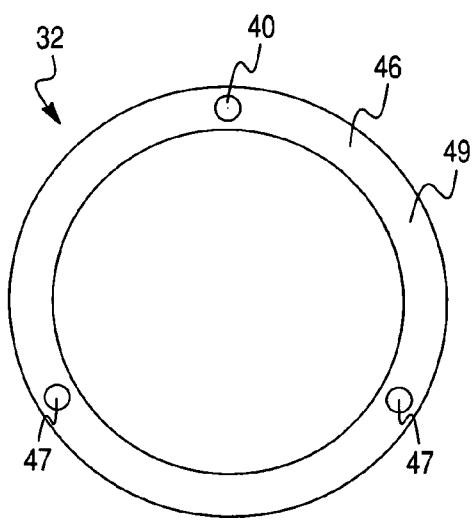
FIG. 6 is a plan view of a non-planar side of the pressure relief valve actuator ring.
Figure 7:
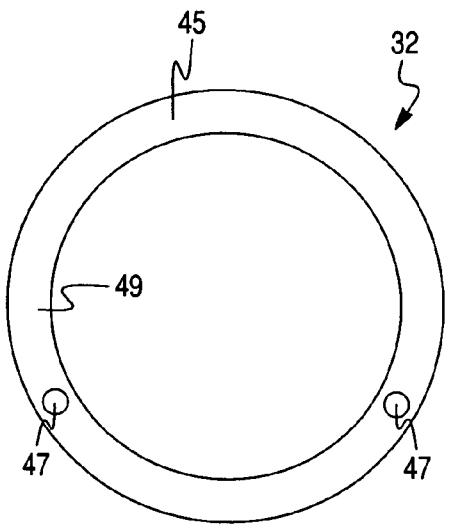
FIG. 7 is a plan view of a planar side of the pressure relief valve actuator ring.

As best shown in FIGS. 5–7, the annular valve actuator ring 32 has a first planar, flat side 45 and a second non-planar side 46. The non-planar side 46 of the actuator ring 32 includes the valve closure member 40, and two apertures 47. The valve closure member 40 has a generally conical shape and corresponds with the valve seat 38 on the face of the differential case 12. The two apertures 47 are positioned to correspond with two dowels extending from the face of the differential case 12 so that the actuator ring 32 slides onto the dowels. As the actuator ring 32 rotates with the differential case 12, the dowels hold the actuator ring 32 in position and ensure that the valve closure member 40 remains aligned with the valve seat 38.

The body 49 of the valve actuator ring 32 may be comprised of metal, preferably aluminum or another non-ferrous alloy. The valve actuator ring 32 may also be comprised of any material known in the art consistent with the function of the actuator ring. The valve closure member 40 may be formed as a single component with the valve actuator ring body 49, or the valve closure member 40 may be formed separately from the valve actuator ring body 49 and attached thereto in any appropriate manner known in the art. In the preferred embodiment, the valve closure member 40 is press-fit into the body 49. The valve closure member 40 may be comprised of the same or a different material than the ring body 49.

FIG. 8 shows a plan view of the pusher bracket 39b disposed within the bushing 31 as viewed in the direction the arrow 36 in FIGS. 3 and 4. The pusher bracket 39b includes at least one spline 35 extending from the inner periphery of the pusher bracket 39b to limit relative rotation between the pusher bracket 39b and the bushing 31. The bushing 31 also includes lugs 37 that overlap the pusher bracket 39b and limit the axial movement of the pusher bracket 39b. As shown in FIGS. 3 and 4 and described above, hydraulic fluid flows into and away from the differential case 12 through grooves 51 in the bushing 31.

As shown in FIG. 9, the solenoid assembly 34 is constructed by positioning the coil winding 44 within the bobbin shell 43, and sliding the completed assembly within the coil housing 39a. A retaining molding 42 is then applied to the open side of the coil housing 39a to retain the coil winding 44 therewithin. In the preferred embodiment, the pusher bracket 39b is comprised of plastic, however, other materials should be considered within the scope of the invention.

As best shown in FIGS. 3 and 4, in operation, when electrical current is applied to the solenoid assembly 34 of the pressure relief valve 30, a magnetic flux is created within the coil winding 44, and the solenoid assembly 34 effectively functions as an electromagnet. The electromagnetic field generated within the coil winding 44 creates an attraction between the coil winding 44 and the ferric material that comprises the face of the differential case 12. As the coil 44 is drawn toward the differential case 12, the pusher bracket 39b at the base of the coil housing 39a applies a force to the valve actuator ring 32 and urges the valve actuator ring 32 and the valve closure member 40 into engagement with the valve seat 38. The force applied by the solenoid assembly 34 is directly proportional to the magnitude of the electrical current applied to the coil winding 44.

When the pressure relief valve assembly 30 is in the fully closed position and the valve closure member 40 is fully engaged with the valve seat 38, hydraulic fluid will not circulate out of the differential case 12. Hydraulic fluid will not flow out of the differential case 12 until the pressure generated by the gerotor pump 26 and accumulated in the piston pressure chamber 27c overcomes the axial force imparted to the solenoid assembly 34, which presses the valve closure member 40 into the valve seat 38. When the pressure accumulated in the piston pressure chamber 27c produces sufficient force to push the valve closure member 40 out of the valve seat 38, hydraulic fluid will circulate out of the differential case 12. Therefore, the release pressure of the pressure relief valve assembly 30 is a function of the current supplied to the coil winding 44, and provides a predetermined and selectively variable pressure limit for the hydraulic system. Thus, the pressure relief valve assembly 30 selectively sets the release pressure of the valve closure member 40 based on the magnitude of the electrical current supplied to the coil winding 44, and subsequently, defines the magnitude of the pressure that accumulates within the piston pressure chamber 27c. As described above, as pressure accumulates within the piston pressure chamber 27c, the piston pressure chamber 27c expands so that the piston 27a moves axially and variably engages the friction clutch pack 20 so that the differential is actuated.

From the foregoing description it is clear that the electronically controlled differential assembly 10 of the present invention represents a novel arrangement. The pressure relief valve assembly 30 is mounted outside the differential 10 so that the design of the pressure relief valve assembly 30 is simplified. Additionally, the electromagnetic solenoid assembly 34 operates without an armature, so that the solenoid assembly 34 is less complex and more reliable than prior art designs. The improved solenoid assembly 34 design allows the differential case 12 hydraulic fluid inlet and outlet passages to be moved inwardly thereby addressing the problem of high speed centrifugal oil drain. Further, the conventional ball-type closure valve has been replaced by the valve actuator ring 32 that includes the conical valve closure member 40 and alignment apertures 47, thereby improving the durability and reliability of the valve closing mechanism.

As shown in FIG. 1 and described above, the solenoid assembly 34 of the present invention may be electronically controlled by a differential control module 6 based on one or more vehicle parameters as control inputs, such as a vehicle speed, a wheel speed difference, vehicle yaw rate, a vehicle lateral acceleration, a steering angle, an engine throttle position, a brake application, and a yaw stability control system actuation. A programmable vehicle control mechanism can also be used to interface with the limited slip system.

The description of the preferred embodiments of the present invention has been presented for the purpose of illustration in accordance with the provisions of the Patent Statutes. It is not intended to be exhaustive or to limit the invention to the precise forms disclosed. For example, it is to be understood that while the present invention is described in relation to a speed sensitive limited slip differential, the present invention is equally suitable for use in other hydraulically actuated friction couplings, such as torque coupling mechanisms for a drive-train utilizing a speed sensitive limited slip device. Additionally, although FIG. 1 shows a rear-wheel drive embodiment of the invention, the invention is equally applicable to a front-wheel drive configuration of the differential system.

Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A torque-coupling assembly comprising:
   a torque-coupling case;
   at least one output shaft operatively connectable to said torque-coupling case;
   a friction clutch pack for selectively engaging and disengaging said torque-coupling case and said at least one output shaft; and
   a hydraulic clutch actuator for selectively frictionally loading said clutch pack, said actuator comprising:
      a hydraulic pump for generating a hydraulic pressure to frictionally load said clutch pack; and
      a variable pressure relief valve assembly to selectively control said friction clutch pack,
      an electromagnetic actuator including an electromagnetic coil winding axially movable relative to said torque-coupling case in response to a magnetic flux generated by said electromagnetic coil winding when an electrical current is supplied thereto.

2. The torque-coupling assembly of claim 1 wherein said variable pressure relief valve assembly includes a valve actuator ring having a valve closure member, and a valve seat complementary to said valve closure member, so that said electromagnetic actuator engages said valve actuator ring and generates a variable electro-magnetic force urging said valve closure member against said valve seat so as to selectively vary a release pressure of said pressure relief valve assembly based on a magnitude of the electric current supplied to said electromagnetic actuator.

3. The torque-coupling assembly of claim 1, wherein said pressure relief valve assembly is mounted exterior to said case.

4. The torque-coupling assembly of claim 2, wherein said valve seat is positioned on a first face of said case, said valve actuator ring having at least one alignment aperture for engaging a dowel on said first face of said case so that said actuator ring rotates with said case.

5. The torque-coupling assembly of claim 1, wherein said pressure relief valve assembly is at least partially enclosed in an auxiliary housing, said auxiliary housing being rotatably connected to said case.

6. The torque-coupling assembly of claim 5, wherein a bushing rotatably supports said auxiliary housing on said case.

7. The torque-coupling assembly of claim 2, wherein said actuator ring further comprises first and second alignment apertures extending from a first planar side of said actuator ring to a second non-planar side, said valve closure member having a conical shape and extending from said second non-planar side.

8. The torque-coupling assembly of claim 7, wherein said valve actuator ring comprises first and second circular alignment apertures, said first and second alignment apertures are each spaced an equal distance from said valve closure member around a periphery of said actuator ring.

9. The torque-coupling assembly of claim 2, wherein said valve actuator ring is comprised of non-ferrous metal.

10. The torque-coupling assembly of claim 9, wherein valve closure member is pressed into said valve actuator ring.

11. The torque-coupling assembly of claim 1, wherein said electromagnetic coil winding is encased in a plastic bobbin.

12. The torque-coupling assembly of claim 11, wherein said electromagnetic actuator further includes a coil housing encasing said plastic bobbin and a pusher bracket formed around an inner periphery of said coil housing.

13. The torque-coupling assembly of claim 12, wherein said coil housing is made of metal and said pusher bracket is made of plastic material.

14. The torque-coupling assembly of claim 13, wherein a first face of said pusher bracket abuts said valve actuator ring and an adjacently disposed second face of said pusher bracket abuts a bushing so that said pusher bracket is disposed coaxially to said bushing.

15. The torque-coupling assembly of claim 12, wherein said pusher bracket rides on a bushing.

16. The torque-coupling assembly of claim 15, wherein said pusher bracket includes a spline to limit relative rotation between said pusher bracket and said bushing.

17. The torque-coupling assembly of claim 16, wherein said bushing includes a lug to limit the axial movement of said pusher bracket.

18. The torque-coupling assembly of claim 1, wherein said clutch pack comprises at least one first friction plate coupled to rotate with said at least one output shaft and at least one second friction plate coupled to rotate with said torque-coupling case.

19. The torque-coupling assembly of claim 2, wherein said electromagnetic coil winding engages said valve closure member and urges said valve closure member against said valve seat with an axial force produced by said magnetic flux and determined by said magnitude of said electric current for selectively setting up said release pressure of said valve closure member.

* * * * *